Oct. 26, 1965
G. G. PHILLIPS
3,213,560
CASTING NET
Filed Dec. 16, 1963
2 Sheets-Sheet 2
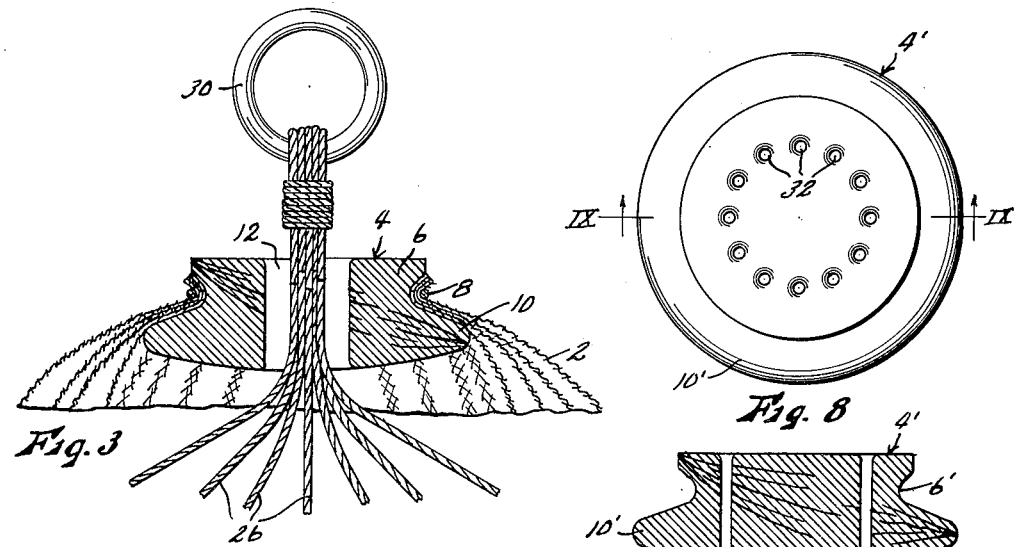
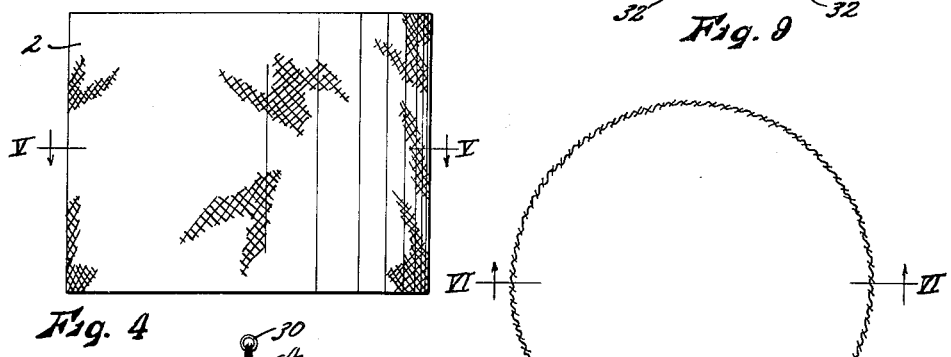
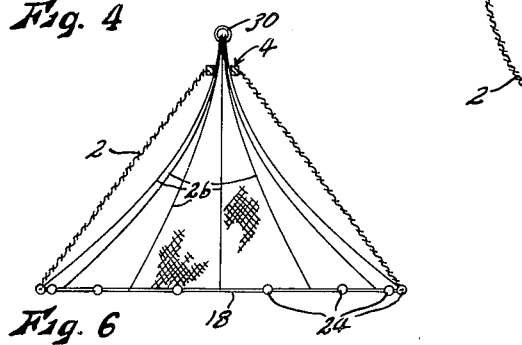
INVENTOR.
Gerald G. Phillips
BY John A. Hamilton
Attorney.

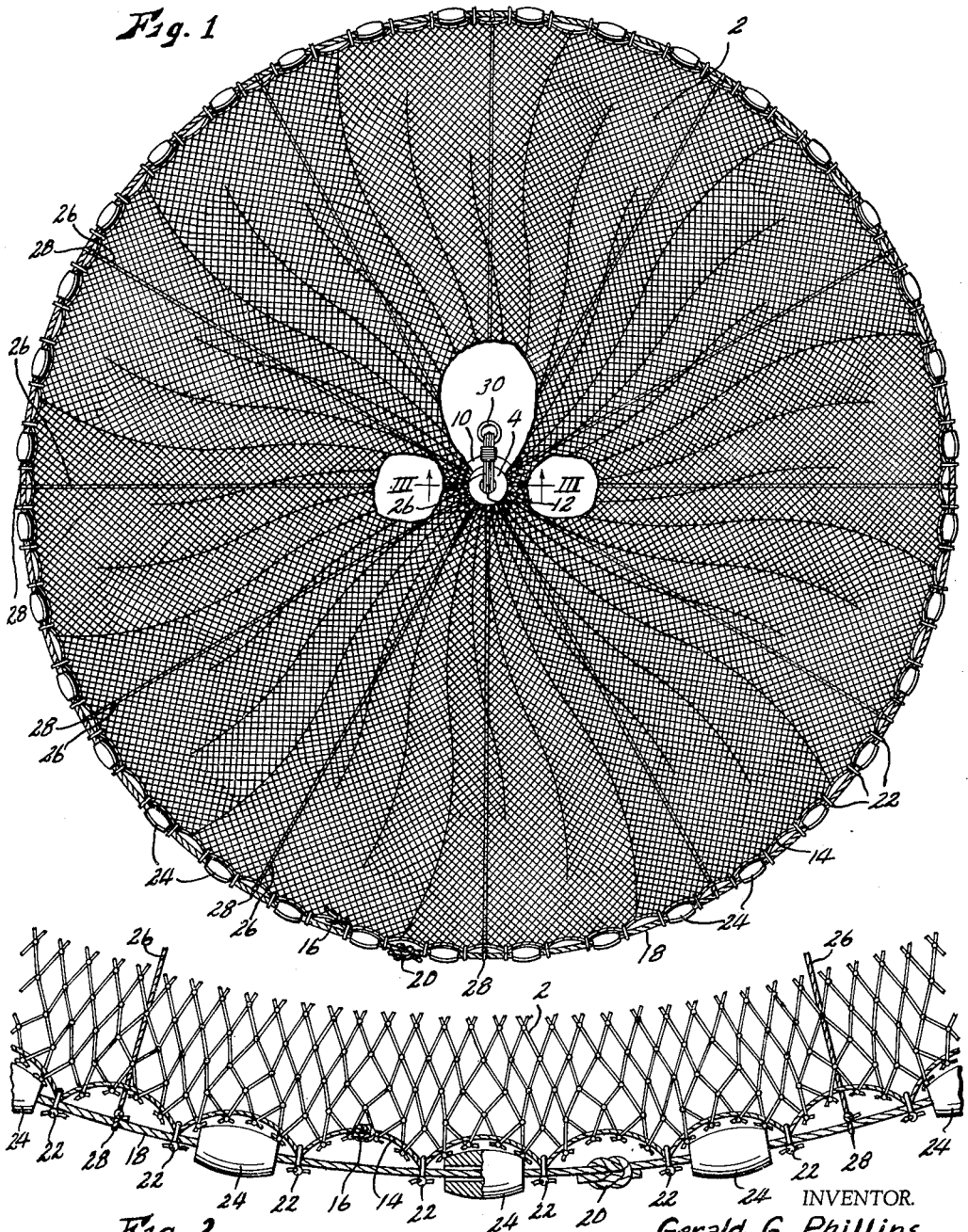

United States Patent Office 3,213,560
Patented Oct. 26, 1965

3,213,560
CASTING NET
Gerald G. Phillips, 2211 Claremont Ave.,
Independence, Mo.
Filed Dec. 16, 1963, Ser. No. 330,670
3 Claims. (Cl. 43—7)

This invention relates to new and useful improvements in fishing apparatus, and has particular reference to casting nets such as are commonly used in fishing.

Casting nets customarily consists of a flat, circular sheet of pliable mesh or net material having an eye or grommet secured centrally therein and a plurality of lead weights attached at intervals to the edge thereof. A series of shroud lines secured to the edge of the net are threaded through the grommet and secured at their opposite ends to a retrieving line. In use, the net is cast or thrown so as to land substantially flat on the surface of the water, with the shroud lines down. The edge of the net is immediately drawn down into the water by the lead weights, and gathered inwardly toward the grommet by the shroud lines as the retrieving line is pulled, whereby the net is "closed" to enclose a generally annular volume. Nets of this type have been subject to a distinct limitation as to the volume or capacity thereof, since even a highly skilled fisherman can conveniently cast a net of only a limited diameter. Also, difficulty often arises in that the central portion of the net sinks through the water at too fast a rate, often as fast or nearly as fast as the weighted edge thereof, with the result that when the shroud lines are pulled the net simply collapses on itself rather than sweeping and enclosing the maximum volume of which it is rendered capable by its configuration.

Accordingly, the principal objects of the present invention are the increasing of the closed volume of the net without increasing the diameter thereof, and the provision of means for maintaining the central portion of the net well elevated as the shroud lines are pulled, whereby the increased volume thereof may be fully utilized. Generally, the first object is accomplished by the provision of a net which is essentially cylindrical in form rather than a flat disc, and the second object is accomplished by the provision of a central grommet which is buoyant and of sufficient volume to exert a substantial resistance to downward movement thereof through the water.

Other objects are simplicity and economy of construction, and efficiency and dependability of operation.

With these objects in view, as well as other objects which will appear in the course of the specification, reference will be had to the accompanying drawing, wherein:

FIG. 1 is a top plan view of a casting net embodying the present invention, shown laid out in the generally circular configuration it assumes at the time it engages the surface of the water when cast.

FIG. 2 is an enlarged fragmentary view of an edge portion of the net as shown in FIG. 1, FIG. 3 is an enlarged fragmentary sectional view taken on line III—III of FIG. 1, FIG. 4 is a side elevational view of only the mesh tube of the net, illustrating the normal cylindrical configuration thereof, FIG. 5 is a sectional view taken on line V—V of FIG. 4, FIG. 6 is a sectional view taken on line VI—VI of FIG. 5, but showing, in schematic form, the entire assembly of the net, and FIG. 7 is a view similar to FIG. 6 but showing the net in its "closed" position, FIG. 8 is a top plan view of the grommet only, showing a slightly modified form of construction, and FIG. 9 is a sectional view taken on line IX—IX of FIG. 8.

Like reference numerals apply to similar parts throughout the several views, and the numeral 2 applies to the mesh tube forming the body portion of the net assembly. This net is formed of series of pliable strands of threads of nylon, cotton or other textile fiber, laid in an intersecting grid pattern, said strands or threads being knotted together at each of their points of intersection. As best shown in FIGS. 4 and 5, the net tube is of normally cylindrical form, the axial length of said tube being less than the diameter thereof, for a reason which will presently be described. The size of the interstices of the net will of course be determined by the type of fish to be caught.

One end of the net tube is gathered and secured tightly to a generally flat, disc-like grommet 4, the net being secured in a peripheral groove 6 of said grommet by a suitable tie cord 8 as best shown in FIG. 3. Below said groove, the grommet is provided with a peripheral flange 10 of substantial diameter, and extending radially outwardly from groove 6, whereby to assist in fanning the net outwardly to lie flat on the water when it is cast, as will presently appear. The grommet is buoyant, being formed of wood or other suitable material, and has a hole 12 formed centrally therethrough.

At the opposite end of the net tube, a lacing line 14 of slightly greater diameter than the net strands is laced through the edgemost interstices of the net, as shown, said lacing line comprising simply a length of cord with its ends tied together as at 16 to form an endless loop of substantially the same diameter as the net. Also provided is a lead line 18 comprising a length of cord still heavier than lacing line 14 with its ends tied together as at 20 to form an endless loop of the same diameter as the net, said lead line being coextensive with lacing line 14 and secured thereto at intervals by tie strings 22. Threaded on lead line 18 at regular intervals through its length are a series of tubular lead weights 24. Said weights are maintained at their proper spacing by their inclusion between successive tie strings 22. A series of shroud lines 26, also comprising lengths of pliable cord, are each tied, as at 28, to lead line 18 at regularly spaced intervals about the periphery thereof. Twelve shroud lines are illustrated in the drawing, although obviously a greater or smaller number could be used if desired. From the lead line, the shroud lines extend along the inner face of the tubular net, and all are threaded through hole 12 of grommet 4, in freely running relation thereto, and secured to a steel ring 30 which is of sufficiently large diameter that it cannot pass through hole 12. The length of the shroud lines is somewhat greater than the axial length of the tubular net. A retrieving line, not shown, may be secured to ring 30 to close and retrieve the net after it has been cast.

In use, the fisherman grasps the lead line 18 at widely spaced apart points, and throws or casts it in a generally horizontal position with shroud lines 26 at the bottom side thereof, at the same time imparting thereto a whirling motion so that the lead line turns in its own plane about the axis of the loop formed thereby. The centrifugal force created by this whirling motion causes the lead line to assume a generally circular configuration, so that the net engages the water in the approximate position shown in FIG. 1. Lead weights 24 immediately pull the edge portions of the net downwardly through the water, while the buoyancy of grommet 4 holds the central portion of the net in a relatively elevated position. That is, while the grommet will be pulled downwardly through the water by the weights, it will nevertheless maintain the central portion of the net above the weights. Then, when the shroud lines 26 are pulled upwardly through grommet 4 by means of a retrieving line fastened in ring 30, they gather the weighted edge of the net inwardly and upwardly toward the grommet, as shown in FIG. 7, thereby enclosing and imprisoning any fish trapped therein.

The principal features of the present invention are the normal tubular or cylindrical shape of the net, and the buoyancy of grommet 4. The tubular net provides a much greater volume when the net is closed than is possible with the customary flat, circular net, and this increase in volume does not require a lead line of greater length and diameter. A fisherman can manipulate and cast a net of only a certain diameter with the necessary dexterity, and therefore the provision of a net with greater volume, without increasing the diameter thereof, is obviously a valuable contribution to the art. The buoyancy of grommet 4 holds the central portion of the net elevated so that the greater volume of the tubular net is fully utilized. The buoyant grommet is particularly important in combination with the tubular net, since otherwise the fullness and slack in the net introduced by its tubular form would tend to allow a general collapsing of the net as it was closed.

The axial length of the tubular net is limited by the necessity that, in order to avoid tangling of the shroud lines and fouling of the net, grommet 4 should land on the water within the loop formed by lead line 18 when the net is cast. It will be seen in FIGS. 4 and 5 that the axial length of net tube 2 is less than the diameter thereof, and it will hence be obvious that the grommet cannot land outside the lead line loop, but must land inside the loop. As a matter of actual practical operation, however, the more or less equal pull exerted on the grommet from all sides by the strands of the net causes said grommet to land approximately at the center of the loop in most instances, which further increases the efficiency of the net in closing about a maximum volume. As the lead weights sink through the water, they exert tension on the net which further tends to center the grommet. The flange 10 of the grommet functions to fan or spread the net thereabout to assist in causing the net to land on the water as smoothly and as nearly horizontal as possible, and to cause the grommet itself to land in an upright position.

FIGS. 8 and 9 show a slightly modified grommet 4' similar in all respects to grommet 4, corresponding parts being identified by corresponding primed numerals, except that instead of being provided with a single central aperture through which all of the shroud lines 26 are trained, it is provided with a series of smaller apertures 32, it being understood that one shroud line runs freely through each of said apertures. This arrangement has been found to provide greater insurance against the possible tangling or fouling of the shroud lines.

While I have shown and described certain specific embodiments of my invention, it will be readily apparent that many minor changes of structure and operation could be made without departing from the spirit of the invention as defined by the scope of the appended claims.

What I claim as new and desire to protect by Letters Patent is:

1. A casting net comprising:
   (a) a pliable net which is structurally of elongated tubular form,
   (b) a buoyant grommet of eye form and being of much smaller diameter than said tubular net, one end of said net being gathered and secured to the periphery of said grommet,
   (c) a series of weights secured to the opposite end of said net at spaced intervals about the periphery thereof, and
   (d) a series of shroud lines secured to the weighted end of said net at spaced intervals about the periphery thereof, said shroud lines extending along the inner face of said tubular net and running freely through said grommet.

2. A casting net as recited in claim 1 wherein said grommet is circular and of generally disc-like form, said net being secured to the periphery of said grommet, said grommet being provided with a peripheral flange extending radially outwardly from and directly adjacent the line of attachment of the net thereto, within the interior of said net, whereby to spread the net generally flat directly adjacent said grommet.

3. A casting net as recited in claim 2 wherein said tubular net is structurally cylindrical and has an axial length less than the diameter thereof.

References Cited by the Examiner

UNITED STATES PATENTS

| | | | |
|---|---|---|---|
| 1,154,563 | 9/15 | Dorsey | 43—8 |
| 2,600,773 | 6/52 | Hungerford | 43—12 |
| 2,723,481 | 11/55 | Schwartz | 43—7 |

SAMUEL KOREN, *Primary Examiner.*

FRANCIS R. CHAPPELL, ABRAHAM G. STONE,
*Examiners.*